United States Patent
Mains (10) Patent No.: US 6,224,128 B1
(45) Date of Patent: May 1, 2001

(54) ADJUSTABLE SHELF FOR VEHICULAR CAMPER

(76) Inventor: David R. Mains, 603 Pine Cone Cove, Niceville, FL (US) 32578

( * ) Notice: Subject to any disclaimer, the term of this patent is extended or adjusted under 35 U.S.C. 154(b) by 0 days.

(21) Appl. No.: 09/339,655

(22) Filed: Jun. 24, 1999

(51) Int. Cl.$^7$ .................................................. A47B 96/00
(52) U.S. Cl. .................................. 296/37.6; 296/100.02; 108/44
(58) Field of Search ................. 296/37.6, 37.16, 296/37.8, 164, 170, 156, 24.1, 100.02; 410/145, 150, 133; 108/44, 143; 248/239, 240.3, 240.1, 424

(56) References Cited

U.S. PATENT DOCUMENTS

| | | | |
|---|---|---|---|
| 915,085 | * | 3/1909 | Fairbanks ............................ 108/143 |
| 2,170,013 | * | 8/1939 | Detwiler ............................... 108/143 |
| 2,503,602 | * | 4/1950 | Titley ..................................... 108/44 |
| 2,784,027 | | 3/1957 | Temp ................................... 296/156 |
| 2,867,471 | * | 1/1959 | Coon, Jr. ............................... 108/44 |
| 3,857,601 | * | 12/1974 | Robbins ................................ 296/10 |
| 3,929,371 | * | 12/1975 | Gibson .............................. 296/24 R |
| 4,243,260 | * | 1/1981 | Gieseking .......................... 296/24.1 |
| 4,469,364 | * | 9/1984 | Rafi-Zadeh ........................ 296/37.6 |
| 4,480,675 | * | 11/1984 | Berkemeier ...................... 296/37.16 |
| 4,522,326 | | 6/1985 | Tuohy, III ........................... 224/310 |
| 4,573,731 | | 3/1986 | Knaack et al. ..................... 296/37.6 |
| 4,635,992 | | 1/1987 | Hamilton et al. .................. 296/37.6 |
| 4,733,898 | | 3/1988 | Williams ............................ 296/24.1 |
| 4,830,242 | * | 5/1989 | Painter ................................ 296/37.6 |
| 4,848,581 | * | 7/1989 | Resore et al. ........................ 206/521 |
| 4,848,824 | * | 7/1989 | Smith et al. ........................ 296/37.6 |
| 4,932,704 | * | 6/1990 | Ament ............................... 296/37.16 |
| 5,083,828 | * | 1/1992 | Accettura .......................... 296/37.6 |
| 5,125,710 | | 6/1992 | Gianelo ............................. 296/37.1 |
| 5,143,417 | * | 9/1992 | Philley et al. ...................... 296/170 |
| 5,228,823 | * | 7/1993 | Crook ................................. 410/150 |
| 5,263,761 | * | 11/1993 | Hathaway et al. ................. 296/37.6 |
| 5,540,158 | * | 7/1996 | Ford ..................................... 108/44 |
| 5,593,272 | * | 1/1997 | Green ................................. 296/164 |
| 5,685,593 | * | 11/1997 | O'Connor .......................... 296/39.2 |
| 5,887,934 | * | 3/1999 | Smith ................................. 410/145 |

* cited by examiner

Primary Examiner—Joseph D. Pape
Assistant Examiner—Hilary Gutman
(74) Attorney, Agent, or Firm—William B. Noll (57) ABSTRACT

A slidable and adjustable shelf assembly adapted to be fitted to the rear of a pickup truck, more precisely the side walls. While overriding such side walls, the shelf assembly is in rolling contact with a rigid canopy or camper shell fixed to the side walls. The assembly includes a pair of U-shaped members which telescopically engage a pair of intermediate joining members to form a generally rectangular frame sized to fit the truck side walls, and to receive a pair of overlapping planar panel members. The respective U-shaped members are each provided with at least a pair of spring biased, roller members that include complementary roller wheels maintained in rolling contact with the side walls and rigid canopy during sliding movement of the shelf assembly, even where the canopy walls are in a nonparallel relationship. Further, a clamping device is provided to prevent premature movement of the shelf assembly.

10 Claims, 7 Drawing Sheets

ADJUSTABLE SHELF FOR VEHICULAR CAMPER

FIELD OF THE INVENTION

This invention is directed to the field of camper accessories, more particularly to an adjustable shelf assembly for positioning on the sides of a pickup truck within a rigid canopy.

BACKGROUND OF THE INVENTION

The present invention relates to an adjustable shelf assembly, in combination with a rigid canopy that overrides and is secured to the side walls of a pickup truck, where the assembly is adjustable to fit varying distances between the respective side walls. The assembly is lightweight, yet sufficiently rigid to transport a variety of camping gear, tools, etc. When desired to open the full canopy space to sleep, for example, the assembly may be readily removed and stored.

The prior art contains a number of patents directed to camper accessories as reflected in the following patents:

a.) U.S. Pat. No. 5,125,710, to Gianelo, teaches an under platform drawer adapted for mounting on a utility vehicle. The drawer is adapted to increase the storage capability of the vehicle while not affecting the previously provided storage area. The drawer includes a pair of parallelly mounted guide tracks adapted to be secured orthogonally to the longitudinally extending frame members of the truck's chassis. A pair of parallelly positioned guides are displaceably mounted on the guide tracks. A storage drawer is fixedly mounted to the guides whereby the drawer may be extended outwardly or returned inwardly along an axis orthogonal to the longitudinal axis of the vehicle.

b.) U.S. Pat. No. 4,733,898, to Williams, relates to a combination storage unit/auxiliary bed liner assembly for nesting engagement onto the bed of a pickup truck. The storage unit covers the entire open area of the pickup bed, with the space between the auxiliary bed liner and the truck bed being partitioned to provide multiple storage compartments. A top-opening auxiliary storage compartment is formed on each side of the two rear wheel well regions. Two pull-out drawers are received within adjoining central compartments and extend substantially the entire length of the truck bed. The pull-out drawers provide secure storage compartments for tools and equipment, and also serve as work tables. The auxiliary cargo deck liner is supported by interior side panels, a central partition and engagement of saddle/bridge deck portions onto wheel well flanges.

c.) U.S. Pat. No. 4,635,992, to Hamilton et al., is directed to a storage box suspended on side rails in such a manner that it can be slid along the length of the cargo compartment of a conventional pickup truck bed. The storage box can be easily opened from the front or rear of the cargo bed. The top panel can be completely removed from the storage box while it is held in a confined space with limited headroom.

d.) U.S. Pat. No. 4,573,731, to Knaack et al., teaches a drawer-type storage unit for use in a vehicle having a floor defining a floor space having a horizontally accessible access position. The storage unit defines a raised floor when installed on the vehicle floor which is adapted to support a load in a manner similar to the vehicle floor itself. The storage unit includes a drawer formed of a plurality of U-shaped channels having the legs thereof welded together and having hemmed top edges. The drawer includes a front wall which is recessed within the storage unit housing in the closed position thereof and sealed to the top and sidewalls of the housing so as to effectively prevent passage of water and other environmental materials into the drawer in the closed position. The rear of the housing is sealingly closed. The storage unit includes a number of different rigidifying structures to provide a high strength and rigidity therein. The drawer is carried on a heavy duty roller bearing slider for facilitated movement thereof between the closed and open positions.

e.) U.S. Pat. No. 4,522,326, to Tuohy, III, relates to a tool box that allows a truck owner to access tools without having to climb in or out of the truck. The tool box consists of a frame having rollers which are received in a pair of channels fastened to the inside of the truck bed. It further includes a pole with a hook for pulling or pushing the box, and the pole also serves to render the box stationary when the truck is in motion.

f.) U.S. Pat. No. 2,784,027, to Temp, discloses a broad drawer unit for a pickup truck, more precisely, the unit comprises a false load-carrying floor above the bed with a large drawer, fitting between the bed and such false floor and arranged as a relatively complete kitchen and commissary unit. The unit is mounted on the portion of the truck in such a manner that the unit may be readily pulled out for use when the rear end tailgate is lowered, or fully retracted into the portion to then allow closing of the tailgate.

While the prior art offers various methods to better utilize the bed of a pickup truck, none present an adjustable shelf that works in combination with a rigid canopy or camper shell. The manner by which the present invention provides a convenient and removable, extra storage space within a vehicular camper shell will become apparent in the further description, particularly when read in conjunction with the accompanying drawings.

SUMMARY OF THE INVENTION

This invention is directed to a sliding, adjustable shelf assembly for mounting over a vehicle bed, such as for a pickup truck. More particularly, the invention relates to the combination of a vehicle, i.e. pickup truck having a generally flat rearwardly extending bed defined by a floor and a pair of upwardly extending side walls, and a rigid canopy overriding and extending over the bed to provide cover thereto. The adjustable, sliding shelf assembly is adapted to be positioned on the side walls in sliding contact with the canopy. The shelf assembly comprises a frame composed of a pair of U-shaped members, each said member having a base and two free arms extending perpendicular to said base. Means are provided to join and align an arm of each U-shaped member, whereby to fix the spaced apart bases to a distance equal to the distance between the side walls. Further, at least a pair of spring biased roller members are included and positioned to laterally extend from each base and arranged to override the side walls in contact with the canopy. Finally, a pair of planar, overlapping panel members are positioned on the frame for receiving items to be transported thereon. Preferably, the panel members include a transverse support to ensure rigidity to the panel members.

Accordingly, an object of this invention is the provision of a space saving, adjustable shelf assembly for use with a pickup truck having a camper shell mounted thereon.

Another object hereof lies in the use of an adjustable, sliding shelf assembly that utilizes plural, spring biased roller members that help to maintain the stability of the assembly when mounted over the bed of a pickup truck.

A further object of the invention is the enhanced storing and transporting capabilities of the pickup truck so equipped.

These and other objects will become more apparent to a person skilled in the art from a reading of the following specification.

DETAILED DESCRIPTION OF PREFERRED EMBODIMENT

The present invention relates to an adjustable, slidable, shelf assembly to be used in conjunction with a vehicle, such as a pickup truck, having a rearwardly extending flat bed, and a pair of parallel side walls mounting a rigid canopy, such as a camper shell. The assembly, intended to provide added storage area within the canopy for transporting a variety of items, will now be described with regard to the several Figures, where like reference numerals represent like components or features throughout the several views.

Figure 1:
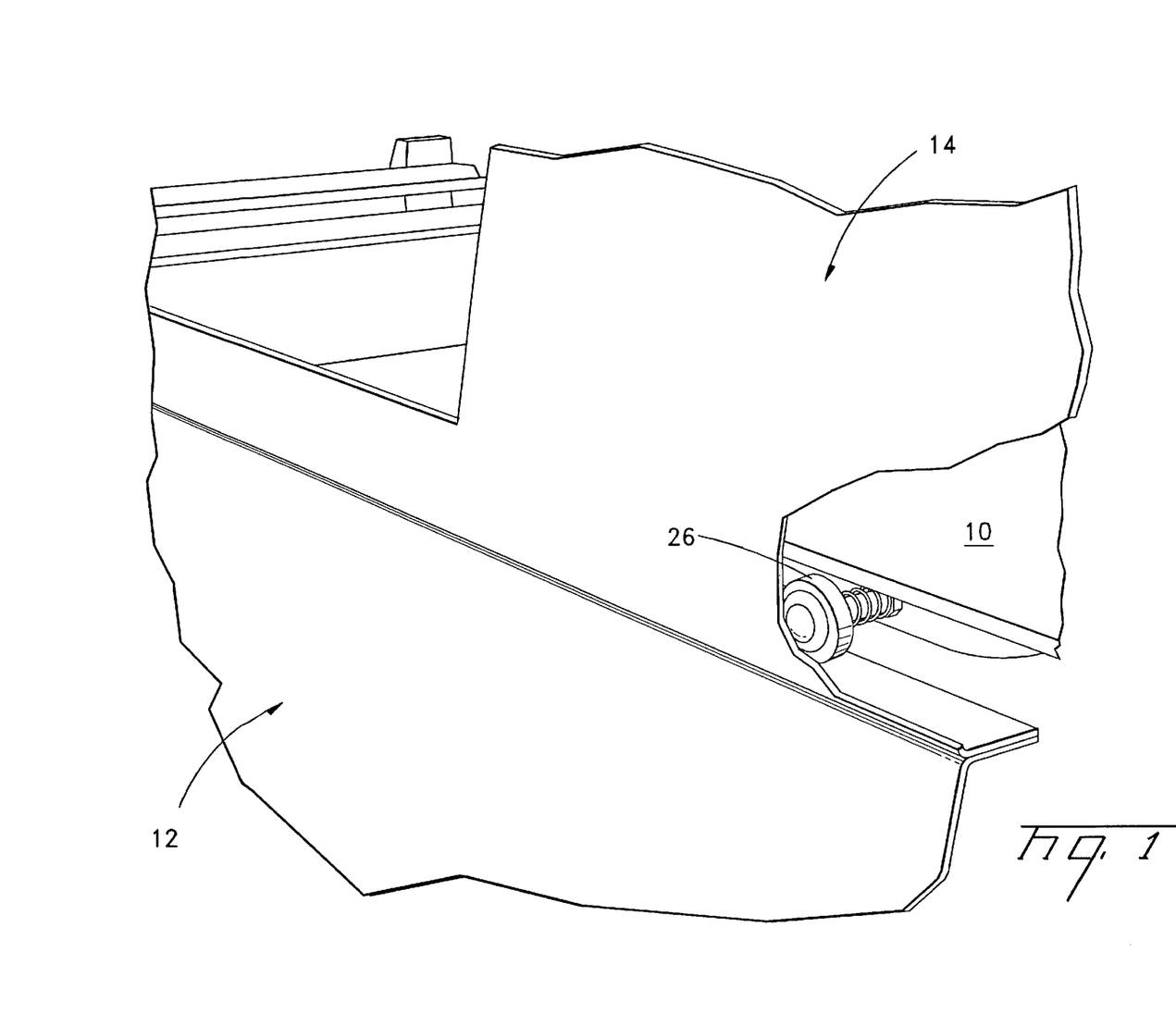
FIG. 1 is a partial perspective view, with portions removed, illustrating the adjustable shelf assembly according to this invention in relation to the side walls or panels of a pickup truck and a rigid, overlying canopy or camper shell.
Figure 2:
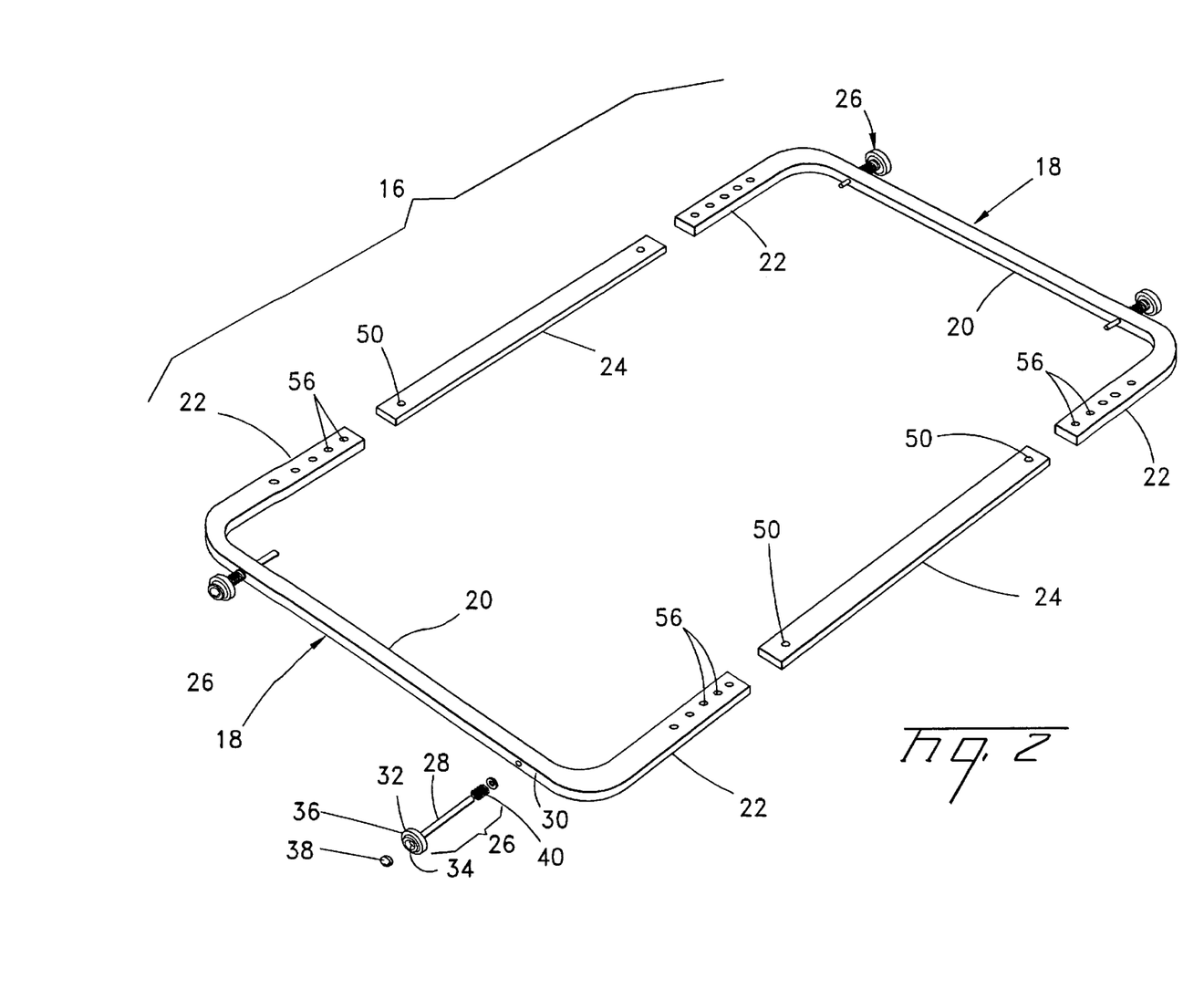
FIG. 2 is an exploded perspective view of the movable and adjustable frame member of the assembly hereof.

FIG. 1, a partial perspective view, with parts removed, shows the adjustable shelf assembly 10 positioned on the side walls 12 (only one side wall being shown) of a pickup truck, for example, and a rigid canopy 14, or camper shell, mounted on said side walls 12.

The assembly 10, as more fully illustrated in FIGS. 2 through 6, comprises a frame member 16 composed at a pair of U-shaped tubular members 18, where such members are defined by a base 20 and a pair of arms 22 extending generally perpendicular to the base 20. The respective aligned arms 22 of the U-shaped members 18 are joined by intermediate, telescopic members 24, note FIGS. 2 through 4 and 7. By this arrangement, and by means to be described later with regard to FIG. 7, the U-shaped members may be fixed relative to one another in a variety of positions to accommodate different sized truck beds. The desired fixed position is to fix the respective bases 20 a distance equal to about the distance between the pair of side walls 12.

Extending from each respective base 20 is at least a pair of spring biased roller members 26. Such roller member as shown in exploded fashion in FIG. 2, comprises a shaft 28 mounted for lateral movement into and out of the outer face 30 of base 20, a roller wheel 32 fixed for rotative movement at the distal or free end of the shaft 28, and a recess 34 within the outer face 36 of roller wheel 32 to receive a spherical or hemispherical guide member 38, the purpose of which will be discussed later. Finally, a coil spring 40, in compression, is positioned on the shaft 28 to bias the roller wheel 32 away from the outer face 36 in an extended or resiled position.

Figure 5:
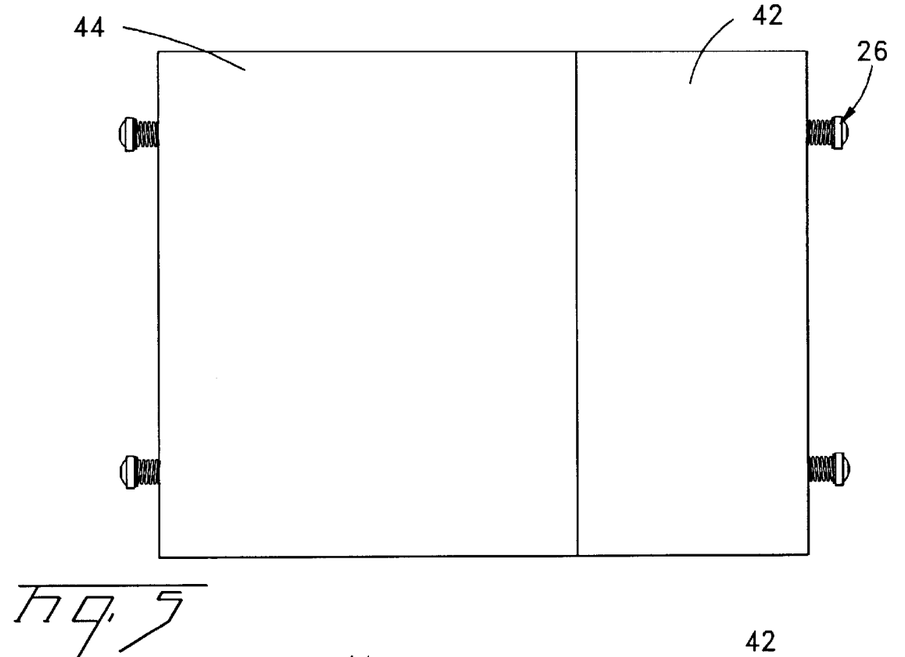
FIGS. 5 and 6 are top views of the assembled frame members of FIGS. 3 and 4, respectively, further showing overlapping panel members.
Figure 6:
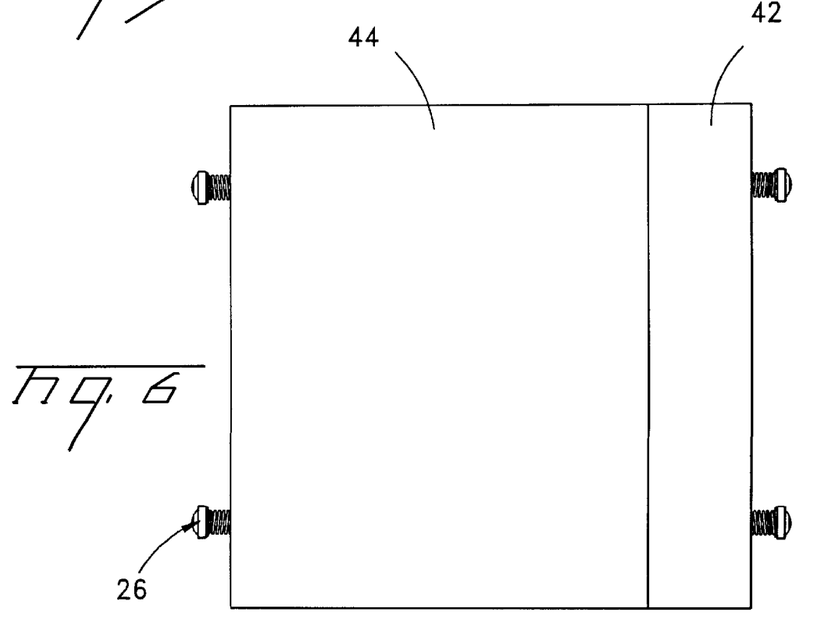
Figure 8:
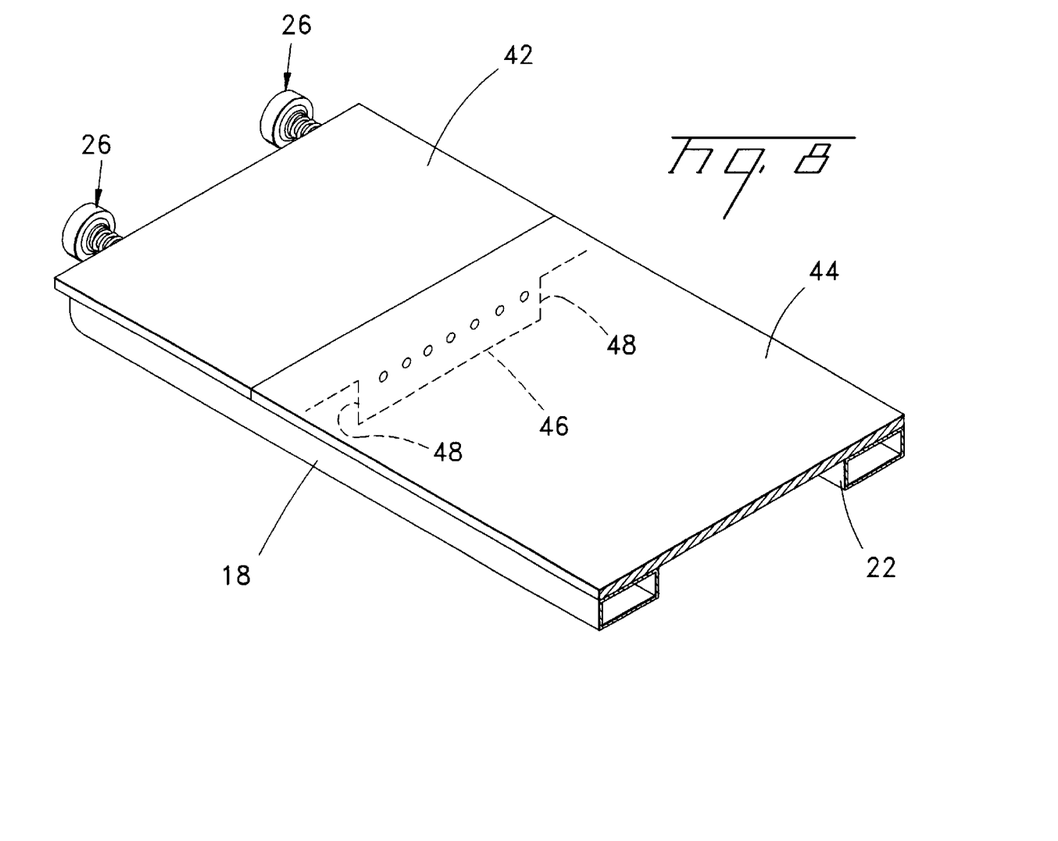
FIG. 8 is a partial perspective view of the assembly of FIG. 5, with portions shown in phantom to illustrate the transverse supporting flange along one edge of a panel member.

Overriding the frame member, are a pair of overlapping planar panels 42, 44, such as wood, a light weight metal, i.e. aluminum, or plastic to function as the supporting surface to goods to be stored thereon for transportation, see FIGS. 5 and 6. To provide transverse support to the overlapping panels 42, 44, the underlying panel 42 may include a strengthening support 46, such as a downwardly extended edged flange, as best illustrated in FIG. 8. The respective edges 48 are spaced inwardly from the frame arms 22 to ensure positioning and sliding movement of the panels 42, 44 relative to the frame member 16.

Figure 3:
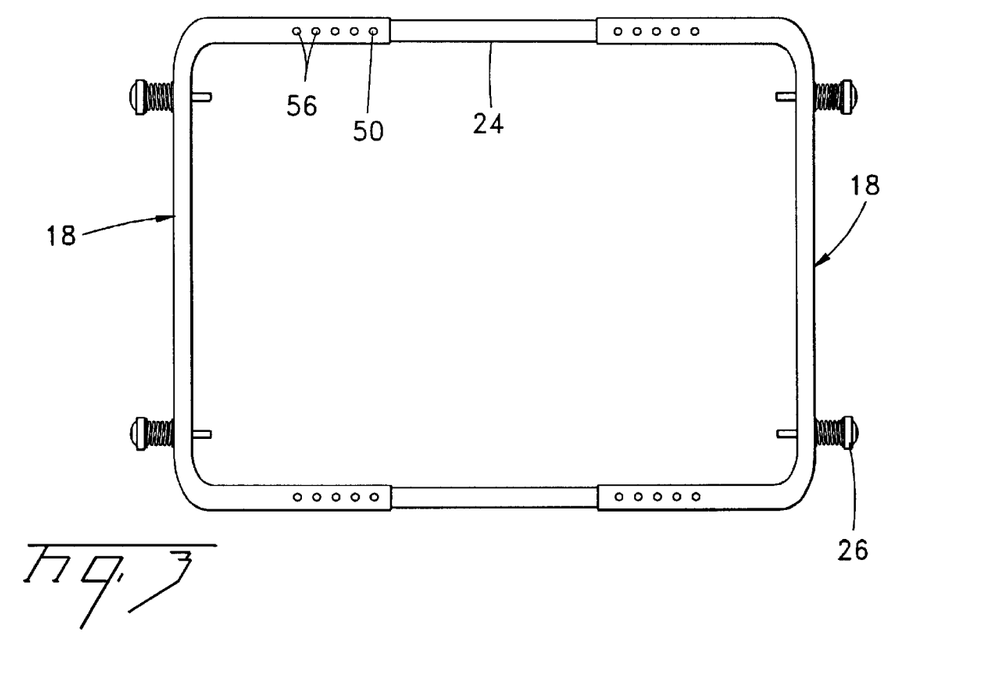
FIGS. 3 and 4 are top views of the assembled frame member of FIG. 2, showing wide and narrow positions respectively.
Figure 4:
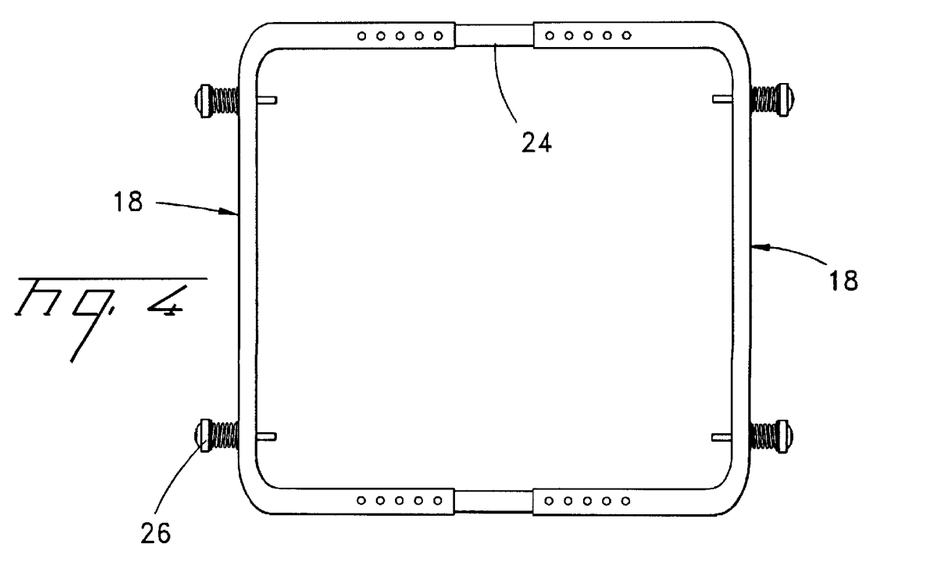
Figure 7:
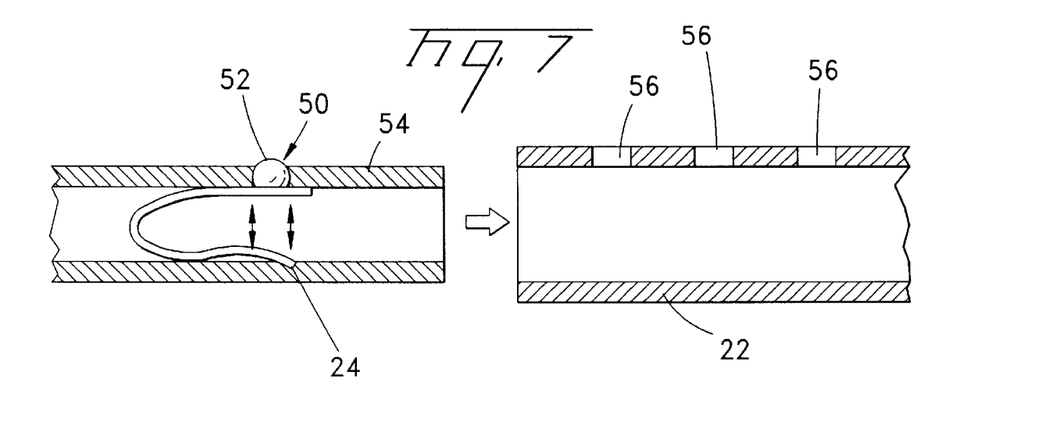
FIG. 7 is an exploded partial sectional view of two components of the frame member showing a single push pin and locking arrangement for the two components.

FIG. 7 illustrates one manner to temporarily secure the arms 22 and associated intermediate member 24 in a telescopic relationship. In this preferred embodiment, the arms 22 mount a push pin 50, as known in the art, that is spring biased to project the ball 52 above the frame face 54. As the frame components are slidably engaged, the ball 52 is initially depressed until it reaches the desired opening 56, thereby temporarily fixing such components by sliding member 24 into arms 22, note the arrow. FIGS. 3 and 4 show two exemplary positions for the frame member 16.

To set up the shelf assembly 10, the respective U-shaped members 18 are interfitted with intermediate members 24 to a rectangular size consistent with the side walls 12 of the truck bed. The roller members 26 thus will lie over the respective side walls 12 with the guide member 38 abutting the inner wall of the canopy 14, then overlaid by the panels 42, 44. It was discovered that canopies, or camper shells, which may be fitted over and fixed to said side walls, typically are aerodynamically designed with upstanding side walls tapering in a convergent manner toward the front of the vehicle, or pickup truck. However, by the use of spring biased roller members 26, the shelf assembly 10 may easily be shifted along the side walls 12 with the respective roller members 26 being urged toward the frame member 16. Even as the roller members 26 are laterally moved inwardly, its respective coil spring 40 counteracts such movement to maintain each guide member 38 in contact with the canopy inner wall.

Figure 9:
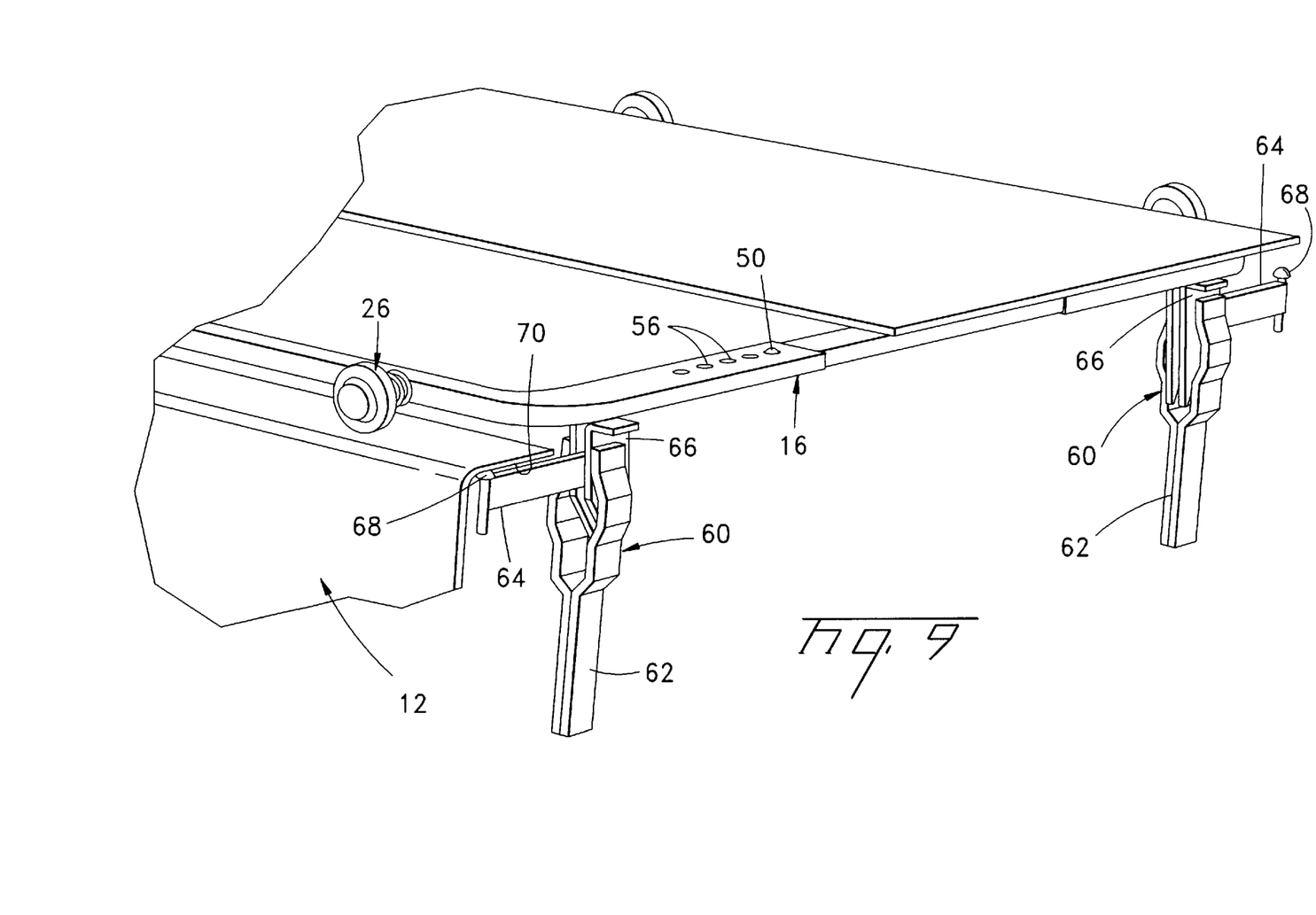
FIG. 9 is a perspective view illustrating a swing clamp in the closed position whereby the adjustable shelf assembly hereof is fixed against inadvertent movement.
Figure 10:
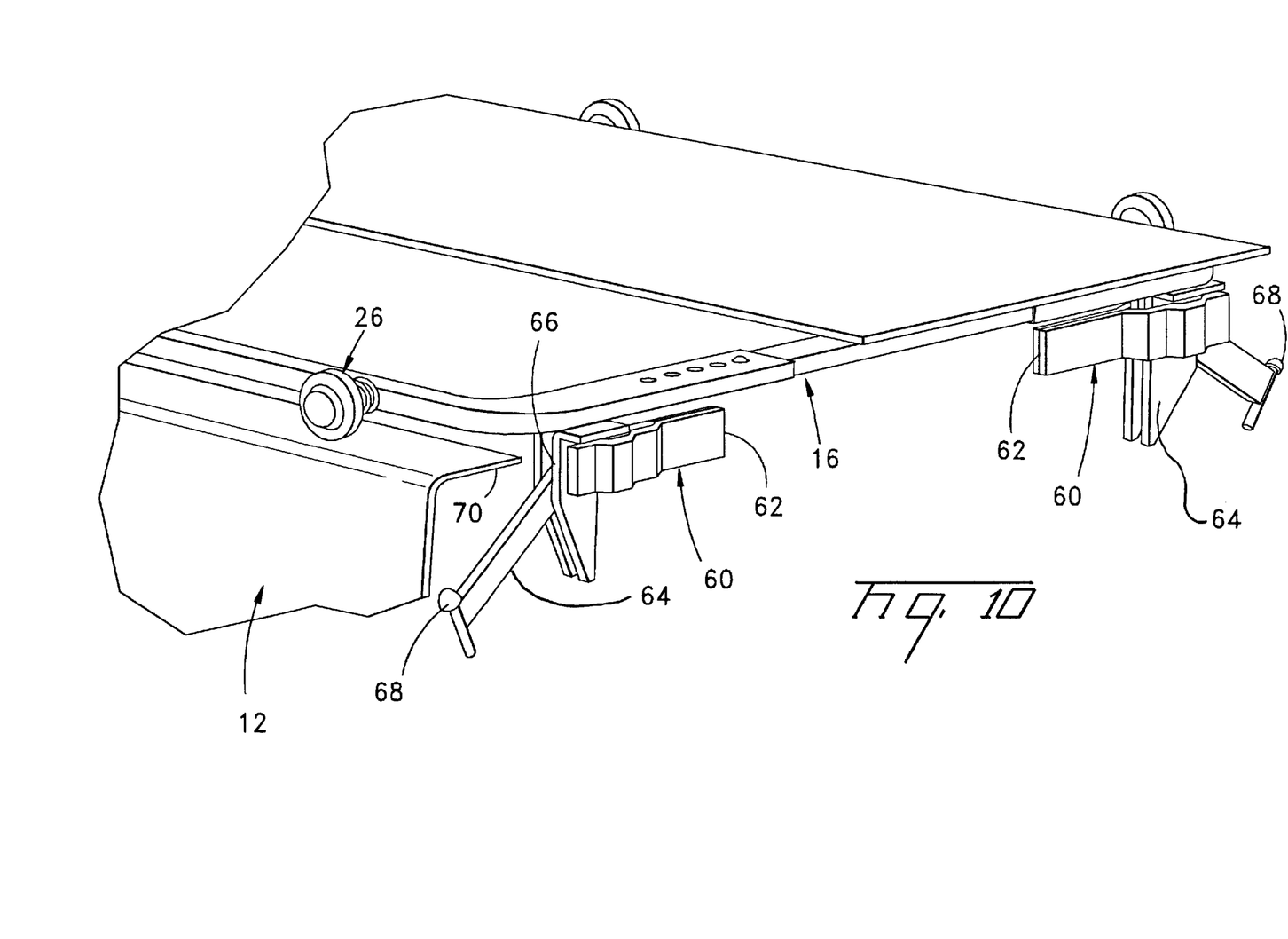
FIG. 10 is a perspective view, similar to FIG. 9, showing the swing clamp in the opened position.

Since the preferred shelf assembly of this invention has a longitudinal dimension equal to about one-half the length of the truck bed, and thus is movable, a typical stored position would be forward toward the cab. However, in use, as a table or working surface, the assembly would be moved rearwardly toward the open or accessible end of the bed. In such position, it may be desirable to lock the assembly against an inadvertent movement. FIGS. 9 and 10 illustrate a convenient means to lock the shelf assembly relative to the truck side walls. Such Figures illustrate a swing clamp 60, as known in the art, which includes a manually movable handle 62, operable to pivot L-shaped member 64 within a fixed flange member 66. The handle 62 and L-shaped member 64 have off-set pivot points such that a greater initial force is required to pivot the handle, but then reduces to a lesser force to help swing and finally position the clamp in the closed position. This ensures that premature movement will not occur. In any case, as the swing clamp 60 is pivoted into the closed position (FIG. 10), the fixed flange member 66, mounting a vertically adjustable screw 68, is brought into contact with the underside 70 of the truck side wall 12 (FIG. 9). By this arrangement, the user thereof has a temporarily fixed shelf to work upon, or conveniently retrieve items therefrom. Also, should the shelf remain in this position during movement of the truck, it will not move independently, such as by stopping the truck.

It is recognized that changes, variations and modifications may be made to the shelf assembly of this invention without departing from the spirit and scope of the invention. Accordingly, no limitation is intended to be imposed thereon except as set forth in the appended claims.

What is claimed is:

1. In combination with a vehicle having a generally flat rearwardly extending bed defined by a floor and pair of upwardly extending side walls, and a rigid canopy overriding and extending over said bed to provide cover thereto, an adjustable, sliding shelf assembly adapted to be positioned on said side walls in sliding contact with said canopy, said shelf assembly comprising a frame composed of a pair of U-shaped members, each said member having a spaced apart base and two arms extending perpendicular to said base, means to join and align one said arm of each said U-shaped member, whereby to fix the spaced apart bases to a distance equal to the distance between said side walls, at least a pair of spring biased roller members laterally extending from each said base arranged to override said side walls in contact with said canopy, and a pair of planar, overlapping panel members positioned on said frame for receiving items to be transported thereon.

2. The combination according to claim 1, wherein said arms are tubular in cross section and said means include a pair of telescopic, intermediate members for sliding engagement with said tubular arms, where said tubular arms include a series of openings and said telescopic, intermediate members each include a pair of push pins for engagement with one of said openings in said tubular arms, whereby to fix the distance between said bases.

3. The combination according to claim 1, wherein said spring biased roller members each comprise a shaft laterally extending from a said base, said shaft having a distal end mounting a roller, and a coil spring about said shaft biasing said roller away from said base.

4. The combination according to claim 3, wherein each said roller members includes an outwardly extending hemispherical guide member arranged to slidably contact said canopy.

5. The combination according to claim 1, wherein a first of said panel members includes a transversely extending support member to overlie a second panel members.

6. The combination according to claim 5, wherein said transversely extending support member comprises a edged flange projecting downwardly.

7. The combination according to claim 1, wherein said arms are generally rectangular in cross-section exhibiting a pair of broad sides and a pair of narrow sides, where one of said broad sides is a surface upon which said pair of panel members lie.

8. The combination according to claim 1, wherein one said arm of each said U-shaped member includes clamping means cooperating with a respective said side wall to fix said shelf assembly along each of said side walls.

9. The combination according to claim 8, wherein each said side wall includes a longitudinal flange having an underside, and said clamping means includes a pivotal arm for operative contact with said underside.

10. The combination according to claim 9, wherein said pivotal arm includes an adjustable screw to spatially fix said pivotal arm relative to said underside.

* * * * *